United States Patent [19]

Kasai et al.

[11] 3,877,387

[45] Apr. 15, 1975

[54] TRACTION CAR

[75] Inventors: Syoji Kasai; Yoshimitsu Onoda, both of Katsuta, Japan

[73] Assignee: Hitachi, Ltd., Tokyo, Japan

[22] Filed: Nov. 7, 1972

[21] Appl. No.: 304,411

[30] Foreign Application Priority Data
Nov. 12, 1971  Japan.................................. 46-89836

[52] U.S. Cl. ............. 105/49; 104/148 LM; 105/73; 105/75; 105/157 R; 188/165; 318/227
[51] Int. Cl...... B61b 13/12; B61c 3/00; B61c 11/00
[58] Field of Search ......... 105/73, 77, 78, 184, 1 R, 105/73, 74, 165, 49, 75, 157 R; 188/165; 104/148 LM; 318/227

[56] References Cited
UNITED STATES PATENTS

| | | | |
|---|---|---|---|
| 283,759 | 8/1883 | Daft.................................. | 105/77 X |
| 467,243 | 1/1892 | Walter............................... | 104/77 X |
| 731,365 | 6/1903 | Honey................................ | 105/78 |
| 764,856 | 7/1904 | Mahoney........................... | 105/78 X |
| 896,740 | 8/1908 | Mayo................................ | 188/165 |
| 1,656,902 | 1/1928 | Buchli............................... | 105/165 X |
| 2,159,814 | 5/1939 | McCune ............................ | 105/77 |
| 2,270,425 | 1/1942 | Farmer.............................. | 105/77 X |
| 2,838,009 | 6/1959 | Bonanno............................ | 105/77 |
| 2,864,318 | 12/1958 | Toulmin, Jr. ..................... | 105/74 X |
| 2,969,751 | 1/1961 | Toulmin, Jr. ..................... | 105/74 |
| 3,233,559 | 2/1966 | Smith et al......................... | 105/1 R |
| 3,320,506 | 5/1968 | Humphrey........................ | 318/227 X |
| 3,451,354 | 6/1969 | Dowling............................ | 105/184 X |
| 3,577,929 | 5/1971 | Onoda et al. ..................... | 104/148 LM |

*Primary Examiner*—M. Henson Wood, Jr.
*Assistant Examiner*—Howard Beltran
*Attorney, Agent, or Firm*—Craig & Antonelli

[57] ABSTRACT

In an electric traction car comprising in combination adhesion drive means which drives the car through wheels driven by electric motors and electromagnetic drive or brake means which drives or brakes the car not through the wheels, such as linear motors or eddy-current brake means, said electromagnetic drive or brake means is mounted on the car frame through an axle provided independently of that for the adhesion drive means and the wheels, whereby an increase and concentration of the unsprung weight are avoided.

4 Claims, 5 Drawing Figures

TRACTION CAR

This invention relates to an electric car comprising in combination adhesion drive means which drives the car through wheels driven by electric motors and electromagnetic or non-adhesion drive or brake means which drives or brakes the car not through the wheels, such as linear motors or eddy-current brake means.

For driving an electric car, it is necessary to supply a driving force which will overcome the running resistance of the car. However, since the driving force resorts to the adhesion (friction) between wheels and rails, the driving force of an electric motor larger than the adhesion between the wheels and the rails will only result in slipping of the wheels and will not provide a driving force for the car. On the other hand, the running resistance of a car tends to increase with the speed of the car and, therefore, with a driving system which utilizes only the adhesion between wheels and rails, increasing the car speed is subjected to limitation.

As a measure to solve this problem, it has been proposed to use electromagnetic or non-adhesion driving system which does not utilize the adhesion between wheels and rails (e.g., a linear motor driving system) in combination with the above-described adhesion driving system. Namely, by employing the non-adhesion driving system, a shortage of driving force can be eliminated, without inducing slipping of the wheels, since it does not resort to the adhesion between the wheels and rails.

The same thing can be said for braking a car. Namely, an adhesion braking system, such as a wheel braking system or a dynamic braking system, involves the problem that the braking distance cannot be shortened in braking a car from a high speed, and use of a non-adhesion braking system, such as an eddy-current braking system, in combination with the adhesion braking system has been proposed to solve such problem.

However, conventional electric cars of the type in which the adhesion driving or braking system (hereinafter generally referred to as adhesion system) and non-adhesion driving or braking system (hereinafter generally referred to non-adhesion system) are used in combination, have been of the construction in which the adhesion system and non-adhesion system are all mounted on one two-axle truck and, therefore, have had the disadvantage that the unsprung weight becomes large, increasing the danger of damaging the track including rails.

An object of the present invention is to provide an electric car in which an adhesion system and a non-adhesion system are used in combination without increasing the unsprung weight of the truck.

Another object of the invention is to provide an electric car of the character described above which is simplified in construction without increasing the unsprung weight of the truck.

Still another object of the invention is to provide an electric car of the character described above in which the space interval between the non-adhesion system and rails or a stator can be maintained constant independently of the amount of vertical movement of the truck frame.

Other objects will become apparent from the following description on practical embodiments of the invention with reference to the accompanying drawings.

Figure 1:
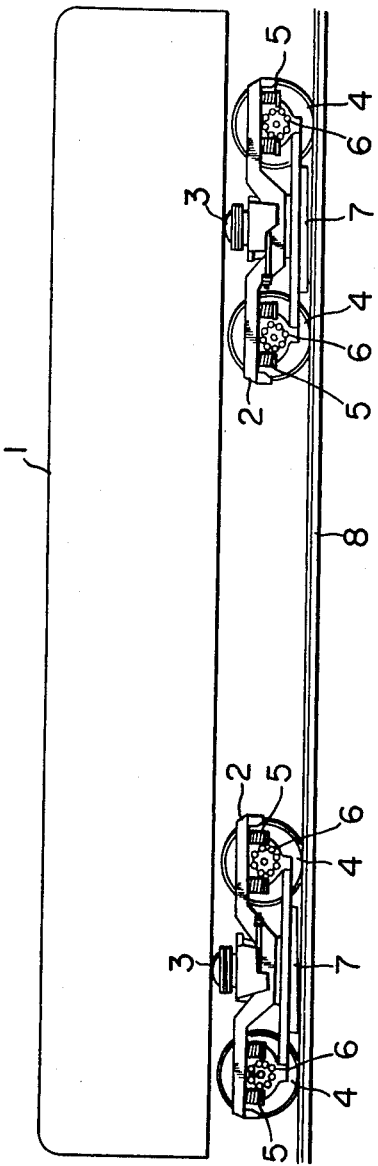
FIG. 1 is a front elevational view of a conventional electric car.

Before going into the description on one embodiment of the present invention, a representative example of prior art electric cars comprising in combination an adhesion driving system and electromagnetic or non-adhesion driving system will be described with reference to FIG. 1. In the electric car shown in FIG. 1, the car body 1 is supported through bolster springs 3 by two trucks 2. The electric car is driven by the drive of main motors (not shown) respectively mounted on the trucks 2, which is transmitted to wheels 4 through gearings, by making use of the adhesion between the wheels 4 and rails 8. On the other hand, a non-adhesion driving system 7 is mounted on bearing boxes 6 or the truck 2 in a manner to create a force longitudinally of the car between it and a stator (which is generally a reaction rail though not apparent) or the rail 8, and drives the car by said force. The wheels 4 are rotatably mounted on the bearing boxes 6 respectively and the bearing boxes are secured to the truck 2 through axle springs 5 respectively. The bolster springs 3 and axle springs 5 serve as shock absorbers for preventing shocks and vibrations from transmitting to the car body during travel of the car.

According to the construction of the prior art electric car described above, the unsprung weight of the truck (the weight of the truck below the axle springs 5) becomes large. Namely, since the non-adhesion driving system 7 is located below the axle springs 5, the weight of the truck below the axle springs 5 increases including the danger of damaging the track surface including the rails. In general, reducing the unsprung weight is advantageous because the mass of the truck corresponding to the unsprung weight hits the rail surfaces not through the intermediary of springs and, therefore, a reduction of this mass or unsprung weight results in lessening of the shock load imposed on the rails. No problem would be encountered if the non-adhesion driving system could be provided above the axle springs 5 because the shocks given thereby to the rails are alleviated by said springs. In practice, however, it is impossible to provide this type of non-adhesion driving system above the springs due to the requirement that a prescribed space interval must always be maintained between it and the stator provided on the track surface. Therefore, it has been the natural consequence that the prior art electric cars are constructed as shown in FIG. 1, but such construction has had the disadvantage set forth above.

Figure 2:
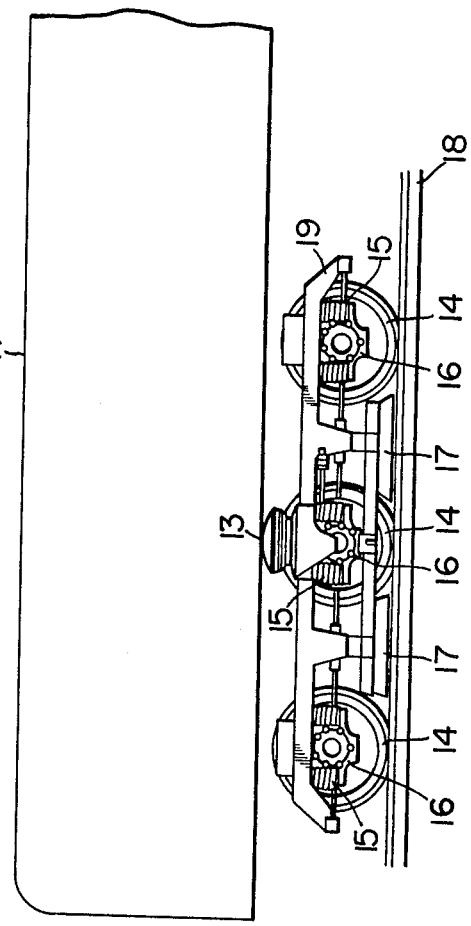
FIG. 2 is a front elevational view of an embodiment of the electric car according to the present invention.
Figure 3:
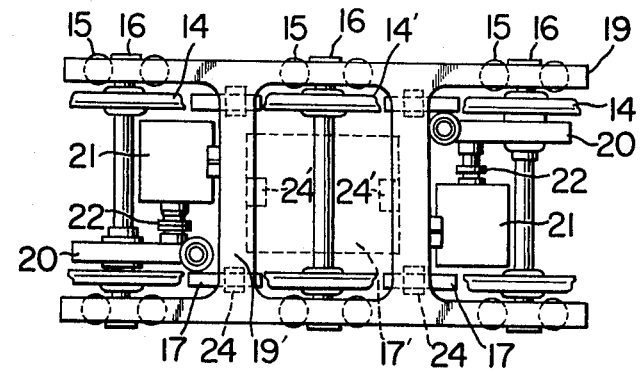
FIG. 3 is a plan view of the truck portion only of FIG. 2.
Figure 4:
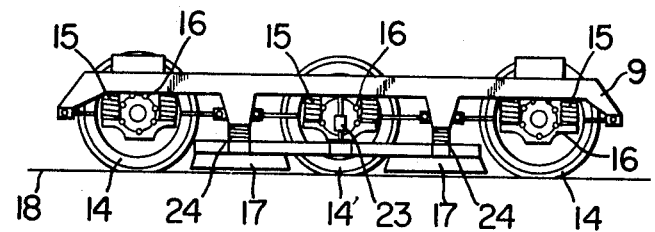
FIG. 4 is a front elevational view of the truck shown in FIG. 3.

In view of the above, the present invention contemplates the provision of an improved electric car of the type described above which is free of the disadvantage of the prior art cars. A practical embodiment of the invention will be described hereunder with reference to FIGS. 2 to 4:

According to the invention, as shown in FIGS. 2 to 4, the body 11 of an electric car is supported on two driving trucks (though one of them is not shown) and each of the driving trucks consists of a three-axle truck. Each three-axle truck comprises two axle and wheel combinations located at the opposite ends of the truck and each having adhesion driving wheels 14 mounted thereon and an axle and wheel combination located between said wheels 14 and having driven wheels 14' mounted thereon. With such arrangement, it is possible to distribute the sprung weight of the truck (the weight of the truck above axle springs 15) to the respective wheels. The adhesion driving wheels 14 are driven by the drive of main motors 21 mounted on a truck frame 19. Namely, the drive of each main motor 21 is transmitted to the driving wheels 14 through a flexible joint 22 and a gearing 20 to drive the car by making use of the adhesion between the wheels and the rails. On the other hand, the above-described adhesion driving system is not provided for the driven wheels 14', but a non-adhesion driving system is arranged in such a manner that the axle of said driven wheels is located at the center thereof. The non-adhesion driving system may be of a type consisting of two parts 17 which are each mounted, with one end connected to the bearing box 16 of the driven wheel 14' through a cushion rubber or the like and the other end connected to the truck frame 19 through dimension adjusting spring means 24, as indicated by the solid lines, or may alternatively of a type consisting of a single body 17' which is connected to transverse beams 19' of the truck frame 19 through dimension adjusting spring means 24' as indicated by the dotted line. Between the bearing box 16 of the central axle of the driven wheels 14' and the truck frame 19 is provided an axle spring deflection detector 23 for detecting the amount of vertical displacement of the truck frame 19, which is variable depending upon the load of the car, e.g., the number of passengers. This axle spring deflection detector 23 controls the dimension adjusting spring means 24 upon detecting the amount of vertical displacement of the truck frame 19, whereby the space interval between the non-adhesion driving system and a stator (not shown) provided on the track, or the rail surface, is automatically adjusted, so as thereby to obtain fully the driving capacity of said non-adhesion driving system. Reference numeral 13 in these Figures designates bolster springs.

According to the embodiment of the invention constructed as described above, the unsprung weight of each of the outer axles includes only the weights of the gearing, the axle and the wheels 14, while the unsprung weight of the center axle includes only the weights of the non-adhesion driving system, the axle and the wheels 14', and consequently the unsprung weight of the truck is distributed and reduced. Thus, it is possible to lessen the damage to be done to the rails as compared with the prior art car. Further, the sprung weight to be supported by each wheel (the load imposed on the axle spring) can be reduced to about four-sixths of that in the prior art car (since the sprung weight of the truck is supported by the six wheels, which has been supported by four wheels in the prior art car), and therefore, a reduction of the dynamic vertical load imposed on each wheel during travel of the car at a high speed, not speaking of the static vertical load on the wheel, can be expected. This also contributes to the prevention of a damage to the track surface including the rails.

Figure 5:
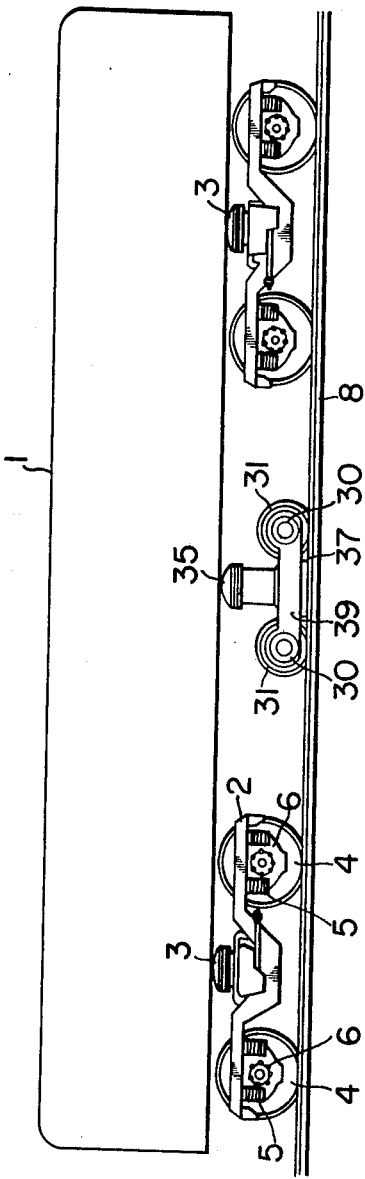
FIG. 5 is a front elevational view of another embodiment of the electric car of this invention.

Another embodiment of the invention is shown in FIG. 5. In this embodiment, a truck 39 solely for a non-adhesion driving system is provided between two adhesion driving trucks 2 and connected to the car body 1 through a bolster spring 35, and the non-adhesive driving system 37 is mounted directly on the transverse or side beams of said truck 39. In FIG. 5, same reference numerals designate same parts as those shown in FIG. 1. According to this embodiment, wheels 31 mounted on the truck 39 can be made smaller in diameter than those of the conventional adhesion driving truck, and hence can be reduced in weight. Further, the construction of axle springs 30 can be simplified and a rubber bush or the like may be used therefor.

Futhermore, since the non-adhesion driving system is provided on the independent truck as stated above, both the unsprung weight of the adhesion driving truck and the weight of the truck can be reduced. This is advantageous not only in obtaining stable high speed running characteristics of the car but also in lessening the damage done to the rails. In addition, the weight of the car body is widely distributed and accordingly the weight of the truck can be reduced. It should also be noted that as a result of arranging the non-adhesion system carrying truck substantially centrally of the two adhesion driving trucks, uniform distribution of the car weight is materialized and hence stable running of the car can be obtained.

Although the present invention has been described and illustrated herein as applied to the driving system of an electric car, it is to be understood that the same effect can be obtained when the invention is applied to the braking system thereof as stated previously.

What is claimed is:

1. An electric car of a type comprising a car body, at least one truck provided with at least one first axle and wheel combination for supporting said car body, and adhesion drive means for driving the car through said at least one first axle and wheel combination from electric motors mounted on said truck, and an electromagnetic means for providing at least one of driving and braking forces to the car by electro-magnetic forces generated in said electromagnetic means, characterized in that said electromagnetic means is mounted with at least one further axle and wheel combination mounted on a second truck, said second truck being provided space and separated from said at least one truck having said at least one first axle and wheel combination of said adhesion drive means, said electromagnetic means being independent of said adhesion drive means.

2. An electric car as defined in claim 1, wherein said second truck is disposed between trucks being provided with said adhesion driving means.

3. An electric car as defined in claim 2, wherein said second truck is disposed between two separated trucks which are provided with said adhesion driving means.

4. An electric car as defined in claim 3, wherein said second truck is disposed centrally between said two separated trucks.

* * * * *